(12) United States Patent
Wei et al.

(10) Patent No.: US 10,229,149 B2
(45) Date of Patent: *Mar. 12, 2019

(54) GLOBAL FILTER FACTOR ESTIMATION

(71) Applicant: International Business Machines Corporation, Armonk, NY (US)

(72) Inventors: Ke Wei Wei, Beijing (CN); Maryela E. Weihrauch, San Jose, CA (US); Hao Wu, Beijing (CN); Xin Ying Yang, Beijing (CN); Miao Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,555

(22) Filed: May 17, 2017

(65) Prior Publication Data
US 2017/0249346 A1 Aug. 31, 2017

Related U.S. Application Data

(63) Continuation of application No. 14/930,736, filed on Nov. 3, 2015.

(51) Int. Cl.
*G06F 17/30* (2006.01)
(52) U.S. Cl.
CPC .. *G06F 17/30345* (2013.01); *G06F 17/30153* (2013.01); *G06F 17/30469* (2013.01); *G06F 17/30699* (2013.01); *G06F 17/30914* (2013.01)
(58) Field of Classification Search
CPC ......... G06F 17/30345; G06F 17/30153; G06F 17/30699; G06F 17/30914
USPC ....................................................... 707/609
See application file for complete search history.

(56) References Cited

U.S. PATENT DOCUMENTS

| 6,006,220 A | 12/1999 | Haderle et al. |
| 7,890,491 B1 * | 2/2011 | Simmen ............ G06F 17/30463 |
| | | 707/713 |
| 9,031,934 B2 | 5/2015 | Yang et al. |
| 2004/0039729 A1 | 2/2004 | Boger et al. |
| 2013/0138630 A1 | 5/2013 | Yang et al. |
| 2013/0159321 A1 | 6/2013 | Bossman et al. |

(Continued)

FOREIGN PATENT DOCUMENTS

| CN | 104283567 A | 1/2015 |
| WO | 2017076152 A1 | 5/2017 |

OTHER PUBLICATIONS

International Search Report, International Application No. PCT/CN2016/101760, International Filing Date: Oct. 11, 2016, dated Jan. 4, 2017, 11 pages.

(Continued)

*Primary Examiner* — Joshua Bullock
(74) *Attorney, Agent, or Firm* — Erik K. Johnson (57) ABSTRACT

A computer maps a literal in a database query to a digital representation, wherein the database query comprises a predicate, the literal is a part of the predicate, and the digital representation is predetermined based at least in part on external statistical data. The computer estimates a filter factor for the predicate based at least in part on the digital representation and compressed statistical data, wherein the compressed statistical data are prepared at least in part from the external statistical data.

7 Claims, 3 Drawing Sheets

(56) References Cited

U.S. PATENT DOCUMENTS

2015/0081651 A1    3/2015  Lyle
2017/0124134 A1    5/2017  Wei et al.

OTHER PUBLICATIONS

IBM: List of IBM Patents or Patent Applications Treated As Related (Appendix P), Jun. 14, 2018, pp. 1-2.

* cited by examiner

| LITERAL (INTEGER) | FREQUENCY | LITERAL LENGTH | SYMBOL (BINARY) | SYMBOL LENGTH |
|---|---|---|---|---|
| 0 | 1580900 | 32-BITS | 0 | 1-BIT |
| 10 | 1245830 | 32-BITS | 1 | 1-BIT |
| 100 | 81880 | 32-BITS | 00 | 2-BITS |
| 1000 | 72230 | 32-BITS | 11 | 2-BITS |
| 10000 | 41220 | 32-BITS | 10 | 2-BITS |

FIG. 3

| ORIGINAL WORD | COMPRESSED DIGITAL |
|---|---|
| 00000001 | 0 |
| 00000322 | 1 |
| 00000004 | 01 |
| 00000595 | 11 |
| 00000846 | 001 |
| 00000002 | 101 |
| 00001243 | 111 |
| 00000010 | 0010 |
| 00002462 | 0110 |
| 00345367 | 0111 |
| 00000489 | 1111 |

FIG. 4

| DIGITAL NUMBER | NUMBER OF DIGITAL | FREQUENCY |
|---|---|---|
| 1 | 2 | 50114 |
| 2 | 2 | 9845 |
| 3 | 3 | 1032 |
| 4 | 4 | 565 |

GLOBAL FILTER FACTOR ESTIMATION

BACKGROUND

The present disclosure relates to data processing, and more specifically, to database query optimization.

A database typically comprises one or more tables for storing data. To retrieve or manipulate the data in the database, a database query may be issued to the database management system (DBMS). Since there may be multiple alternative ways to execute a given query, with widely varying performance, the DBMS' query optimizer may evaluate possible plans and return what it considers the best access plan. Filter factor is an important parameter in creating and evaluating an effective access plan by the database query optimizer.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect of the present disclosure, there is provided a method. The method may comprise: mapping a literal in a database query to a digital representation, wherein the database query comprises a predicate, the literal is a part of the predicate, and the digital representation is predetermined based at least in part on external statistical data; and estimating a filter factor for the predicate based at least in part on the digital representation and compressed statistical data, wherein the compressed statistical data are prepared at least in part from the external statistical data.

According to a second aspect of the present disclosure, there is provided a system. The system may comprise one or more processors, a memory coupled to at least one of the processors, and a set of computer program instructions stored in the memory. The set of computer program instructions may be executed by at least one of the processors in order to perform actions of: mapping a literal in a database query to a digital representation, wherein the database query comprises a predicate, the literal is a part of the predicate, and the digital representation is predetermined based at least in part on external statistical data; and estimating a filter factor for the predicate based at least in part on the digital representation and compressed statistical data, wherein the compressed statistical data are prepared at least in part from the external statistical data.

According to a third aspect of the present disclosure, there is provided a computer program product. The computer program product may comprise a computer readable storage medium having program instructions embodied therewith. The program instructions may be executable by a processor to cause an apparatus to: map a literal in a database query to a digital representation, wherein the database query comprises a predicate, the literal is a part of the predicate, and the digital representation is predetermined based at least in part on external statistical data; and estimate a filter factor for the predicate based at least in part on the digital representation and compressed statistical data, wherein the compressed statistical data are prepared at least in part from the external statistical data.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

The accompanying drawings illustrate exemplary embodiments of the disclosure, which are only for explaining the principle of the disclosure while not for limiting the disclosure from any aspect to those illustrated details both for network environments and operations or specific structure thereof. It should be noted that those drawings show merely elements relating to the embodiments while omit other components may be necessary for operating a network, a device or a method flow or the ones popularly used/deployed thereof, for the sake of illustrating the embodiments concisely and clearly, but this does not mean that those various embodiments exclude any of the above or any additional arrangements.

DETAILED DESCRIPTION

Some embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

The terminology used herein is for the purpose of describing particular embodiments only and is not intended to limit the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

Figure 1:
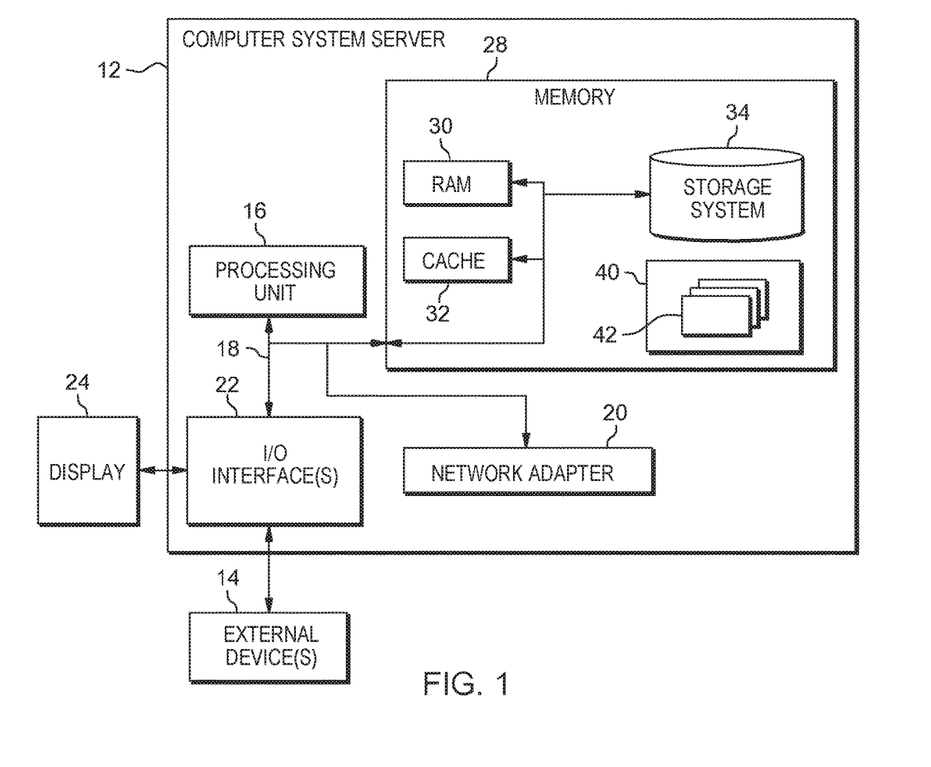
FIG. 1 depicts the hardware components of an exemplary computer system in accordance with an embodiment of the present disclosure.

Referring now to FIG. 1, in which an exemplary computer system/server 12 which is applicable to implement some embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

A database query (for example using Structured Query Language (SQL)) refers to a set of statements, commands or clauses that are used to retrieve data stored in the databases. For instance, a query may specify a particular location (such as a table, row or column) in a database to retrieve data from. During compilation of the query before execution, the DBMS typically parses the query into relational operators that specify how to implement the query. The relational operators may be ordered in a query plan or access plan.

In order to improve performance, a query optimizer in the database system optimizes data access based on query statements and a variety of existing information, such as information related to various tables, rows, indexes, data pages occupied, column value and some aspects of database objects. For example, according to the information provided by the query graph model (also known as the syntax tree), the cost-based optimizer may evaluate respective costs (such as CPU time and I/O count) for the possible access plans, and select the solution with the smallest cost as the best access plan. Filter factors for predicates are calculated during access path selection using the statistics available in the system catalog tables as catalog information. It is these filter factors that help determine the least costly access plan for a given SQL statement.

The filter factor of a predicate is a ratio (a number between 0 and 1) which estimates I/O costs. It is an estimate of the proportion of table rows for which a predicate is true. Those rows are said to qualify by that predicate. The optimizer calculates the filter factor for a query predicate based on the number of rows that will be filtered out by the constraint condition of the predicate. How a filter factor is determined depends on the level of detail in the statistics gathered and how much information is available in the SQL to be optimized.

For example, if basic column level statistics exist for the referenced column, the optimizer assumes a uniform distribution of values across the column and calculates the filter factor accordingly. Here is an exemplary query: Select*From T1 Where C1='X'. Suppose that column C1 of table T1 contains only four distinct values: W, X, Y, and Z. In the absence of other information, it is estimated that one-fourth of the rows have the value 'X' in column C1. Then the predicate C1='X' has the filter factor 0.25 for table T1. Apparently, the assumption of even data distribution in column C1 provides a rough estimate of the filter factor.

Data skew is one of the greatest challenges for the optimizer when determining an accurate filter factor. If there are outliers that are statistically significant, the optimizer could be led to select a bad access path. Although additional statistics such as frequency and histogram may be available, the optimizer cannot make effective use of such statistics to determine the access plan if host variables are used, because uniform distribution of column values may have to be assumed in this situation. On the other hand, considering that the common full language word set is approximately within a scale of 1000000, if the scale of a word set is high for a column, the current statistical technology cannot make the filtering information accurate for each literal in predicates. Therefore, it is desirable to provide an effective solution to make estimation of a filter factor more accurate.

Figure 2:
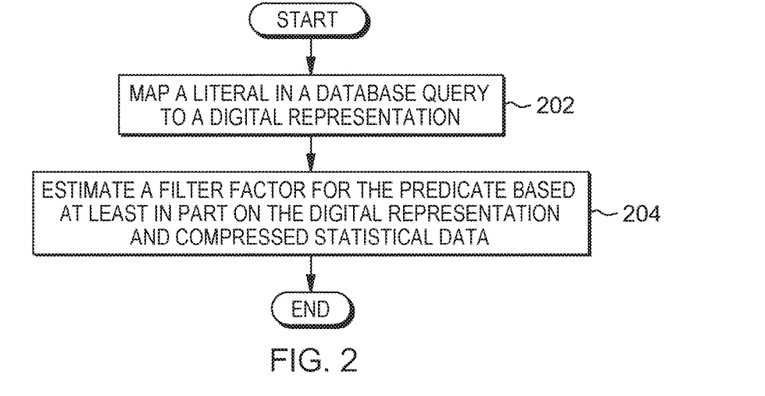
FIG. 2 is a flowchart illustrating the process for filter factor estimation in accordance with an embodiment of the present disclosure.

FIG. 2 shows the process for filter factor estimation in accordance with an embodiment of the present disclosure. In this embodiment, a filter factor can be estimated for a query predicate based on globally collected statistical data external to the column. Thus, the estimated filter factor may be considered as a global filter factor, compared to those determined merely according to the statistics conventionally accumulated in the DBMS.

As shown in FIG. 2, the process starts at step 202, where a literal in a database query may be mapped to a digital representation. The database query comprises a predicate. The literal is a part of the predicate. The digital representation may be predetermined based at least in part on external statistical data. The digital representation may be a compressed representation of the literal, for example, a symbol or digit with fewer bits than the literal. For example, the query may recite "Select*From T2 WHERE C1='00000595'". The literal is "00000595" in the predicate "WHERE C1='00000595'". This literal may be mapped to a digital representation such as binary "11".

The predicate of the database query is related to a column of a table (such as column C1 of table T2). The external statistical data may contain statistical information relevant to content of the column. For example, the column may be associated with the external statistical data when creating the table or during data definition language (DDL) procedure. Such association may be used for correlating data values (or possible literals) of the column to their digital representations. A global dictionary can be generated to maintain the correlation between the values (or possible literals) of the column and their digital representations. Thus, when obtaining the literal in a predicate, the system can check the global dictionary to find the mapped digital representation.

Further, the statistical information relevant to the content of the column may comprise information about occurrences of possible literals in a context relevant to the content of the column. The possible literals may comprise keywords, terms or values obtained from an actual context relevant to the content of the column. Thus, the external statistical data may reflect respective occurrences of the possible literals under the context. As an example, the possible literals may be assigned with respective digital representations having lengths which are related to the occurrences of the possible literals in the context.

For example, the external statistical data may be obtained from an inverted index, which contains people's names in the context of fashion news and the occurrences thereof. The target column addressed by the predicate may be designed to record people's names in the fashion sector. The external statistical data can be associated with the target column. The system can obtain the possible literals and their occurrences in fashion news from the external statistical data, and assign a digital representation to each possible literal (name) based on its occurrences. The name with more occurrences is assigned with a smaller digit. In other words, a symbol or digit used to represent a literal is correlated with how frequently the literal occurs in the relevant context.

Figure 3:
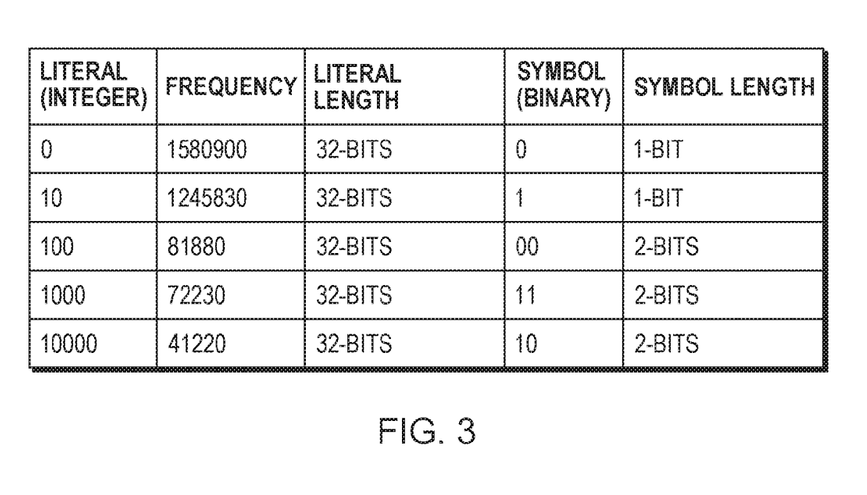
FIG. 3 is a diagram illustrating an exemplary compression scheme in accordance with an embodiment of the present disclosure.

FIG. 3 is a diagram illustrating an exemplary compression scheme in accordance with an embodiment of the present disclosure. As shown in FIG. 3, a literal is a 32-bits integer, while a symbol, as a digital representation of a literal in compressed form, is a binary digit with fewer bits than the literal. It will be realized that various proper encoding algorithms such as Huffman coding and the like may be used to build up a compression scheme applicable to this embodiment.

The parameter of frequency shown in FIG. 3 indicates the number of times that a literal occurs in a certain context. In this embodiment, more frequently occurred literal is represented by a symbol with fewer bits and vice versa. It is apparent that mapping a literal or word to a symbol or digit in compressed form can improve the memory usage efficiency, and the compression scheme may be optimized for a given data distribution by correlating symbol length to occurrence of a literal in the context.

It is noted that a literal may occur in different contexts with distinct occurrences, for example, a person's name "Alice" occurring in a social network frequently but in an enterprise system seldom. A global dictionary corresponding to a certain context may be checked to find the mapped digital representation for the literal in this context. The same literal may be mapped to distinct digital representations according to a diversity of contexts. For example, if a query predicate is to filter a person's name of "Alice" from a DBMS column recording departmental meeting organizers, it is more reasonable to check a global dictionary applicable to an enterprise system instead of a social network.

Figure 4:
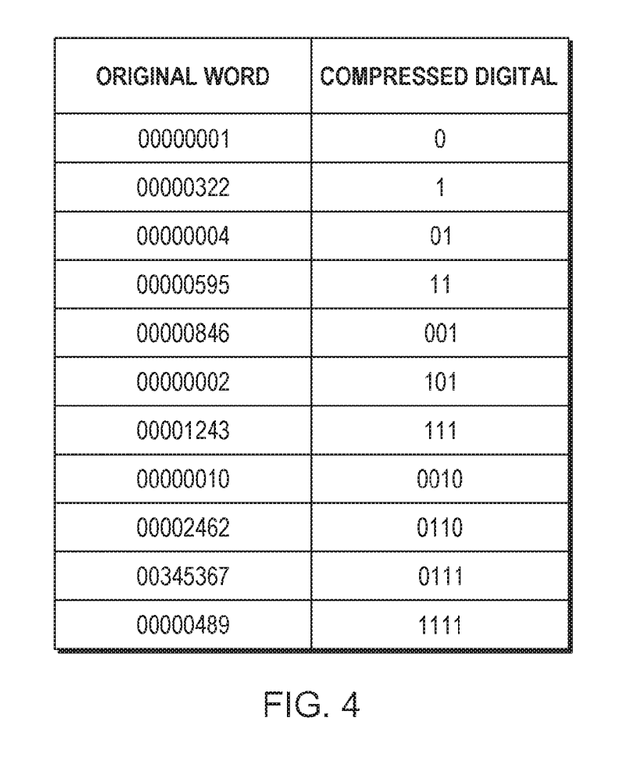
FIG. 4 is a diagram exemplarily illustrating a global dictionary in accordance with an embodiment of the present disclosure.

FIG. 4 is a diagram exemplarily illustrating a global dictionary in accordance with an embodiment of the present disclosure. It will be appreciated that a complete global dictionary for a specified context may store digital representations for an entire set of possible literals in this context, but the content of a column related to a query predicate may not comprise all of these possible literals. Therefore, it is practical for the query predicate to use a part of the global dictionary at least comprising digital representations of those literals contained in the queried column, for mapping a literal in the query predicate to its digital representation.

In FIG. 4, the left column records original words such as literals described in connection with FIG. 2, and the right column records the corresponding compressed digitals such as digital representations of the literals. The part of the global dictionary shown in FIG. 4 comprises 11 rows which respectively indicate 11 distinct data values contained in a target column of a database query.

In the exemplary embodiment, the original words are compressed as digitals with one or more bits, based at least in part on respective occurrences of the original words in a context relevant to the global dictionary. For example, the words "00000001" and "00000322" occur more frequently in the context than the remaining words, thus these two words are represented by the compressed digitals with fewer bits than others. Optionally, the original words may be listed in descending order according to their respective appearance numbers in the context. Particularly, the word "00000001" occurs more frequently than the word "00000322", and thus listed at the first row of the global dictionary even though both of them are represented by a 1-bit compressed digital.

Referring back to FIG. 2, a filter factor can be estimated for the predicate in step 204 based at least in part on the digital representation and compressed statistical data. According to the exemplary embodiment, the compressed statistical data may be prepared at least in part from the external statistical data described previously in step 202. For example, the compressed statistical data may comprise statistical information on a scale of lengths of digital representations determined according to the content of the column related to the predicate. In other word, several items of statistical information relevant to multiple literals of which the digital representations having the same length would be compressed as one item of statistical information. For example, two items of statistical information relevant to literals "00000001" and "00000322" may be compressed as one item of statistical information, since the digital representations of the two literals are 1-bit compressed digital, as shown in FIG. 4.

Optionally, some of the compressed statistical data may comprise statistical information individually collected for at least some of digital representations determined according to content of the column. The statistical information on a scale of lengths of the digital representations may occupy a smaller memory space while providing more complete statistics, although the individually collected statistical information may provide more accurate statistics.

It would be realized that certain catalog information may be added, for example in a specified catalog table, for retrieving the compressed statistic data. Optionally, the compressed statistic data may be updated based at least in part on a change in at least one of: content of the column, and the external statistical data. The update may be performed periodically or as required, for example, by Runstats utility. As an example, a meta dictionary can be generated to maintain the compressed statistical data, which summarizes statistics from the external statistical data and the global dictionary for the column.

Figure 5:
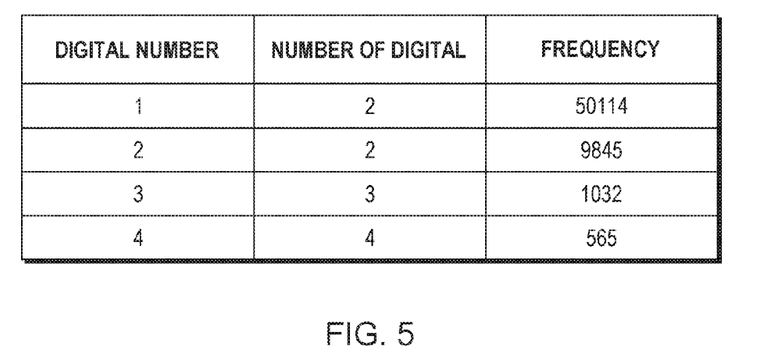
FIG. 5 is a diagram depicting a meta dictionary for the global dictionary shown in FIG. 4 in accordance with an embodiment of the present disclosure.

FIG. 5 is a diagram exemplarily illustrating a meta dictionary for the global dictionary shown in FIG. 4 in accordance with an embodiment of the present disclosure. As mentioned previously, the meta dictionary may provide the compressed statistical data with respect to the corresponding global dictionary. In FIG. 5, three kinds of information are summarized, comprising digital number, number of digit, and frequency. The digital number and the number of digit are statistical information related to the compressed digitals. For a specified digital number which indicates a length of a compressed digital, the number of digit means a total number of compressed digitals having the length indicated by the specified digital number, and the sum of occurrences of the original words represented by these compressed digitals is recorded as frequency, as shown in FIG. 5. It is noted that occurrence of an original word is collected within a context associated with the global dictionary of FIG. 4, instead of a column from which the original word is queried.

As described with respect to the compressed statistical data previously, the statistical information in the meta dictionary as shown in FIG. 5 is prepared on a scale of lengths of compressed digitals in the global dictionary as shown in FIG. 4. For example, there are two compressed digitals of 2 bits in the global dictionary, shown as "01" and "11" in FIG. 4, and thus the number of digit corresponding to the digital number "2" is recorded as "2" in the meta dictionary, as shown in FIG. 5. Correspondingly, the frequency "9845" shown in FIG. 5 represents the sum of occurrences of "00000004" and "00000595" in the context associated with the global dictionary of FIG. 4.

The compressed digitals in FIG. 4 are divided into four groups according to different values of the digital numbers, and thus the statistics are summarized in four rows as shown in FIG. 5. Additionally or optionally, some statistics recorded in the meta dictionary may be individually collected for each of at least one compressed digitals. For example, statistics in the first row of the meta dictionary shown in FIG. 5 may be recorded in two rows, one for "00000001" and the other for "00000322", which may facilitate to estimate a more accurate filter factor for a predicate related to "00000001" or "00000322".

For a sample query literal "00000322", the compressed statistical data obtained from the meta dictionary according to the length (shown as digital number "1" in FIG. 5) of the compressed digital "1" may reflect the occurrence probability of the literal "00000322" in a context relevant to the queried column, for example through statistics comprising the number of digit "2" and four frequency values "50114", "9845", "1032" and "565" shown in FIG. 5.

The statistics in the meta dictionary may be updated by Runstats utility. Updating the meta dictionary may cause a change of data values and/or element numbers in the meta dictionary due to database operations such as Update, Insert and Delete (UID) on the column and/or a variation in the external statistical data. During the delta time period of last Runstats and current Runstats, the corresponding UID influence would not affect the data in the meta dictionary.

In an exemplary embodiment, a filter factor may be estimated as an actual or average value of occurrence probability of a literal in a context associated with the queried column, for example, by using the following expression.

$$ff_j = \frac{F_j}{N_j \sum_{i=1}^{n} F_i} \quad (1)$$

Referring to expression (1) above, n is the maximum of lengths of digital representations determined according to content of the queried column, i and j are natural numbers corresponding to lengths of digital representations, $F_i$ and $F_j$ reflect occurrences of literals corresponding to digital representations having lengths of i and j respectively, $ff_j$ is a filter factor for a predicate comprising a literal corresponding to a digital representation having a length of j, and $N_j$ is the total number of digital representations having a length of j.

In case that $F_j$ is an actual value of occurrence of a literal, for example $N_j=1$, expression (1) calculates the filter factor according to an actual value of occurrence probability of the literal. If $F_j$ is the sum of occurrences of two or more literals, for example $N_j \neq 1$ as shown in FIG. 5, then expression (1) calculates the filter factor according to an average value of occurrence probability of the literal.

For a sample predicate WHERE COL='00000322', the conventional filter factor calculation based on colcard information would estimate the filter factor as 1/11=0.091, while the proposed approach according to the exemplary embodiment calculates the filter factor as 50114/(2*(50114+9845+1032+565))=0.407 with expression (1). Although the frequency in the meta dictionary may not represent actual occurrence of a literal, it may partly reflect occurrence of the literal through the sum of occurrences. This provide an advantage to calculate more accurate filter factors for those seldom occurred literals for which statistical information is usually unavailable in the existing DBMS. The accurate filter factor would benefit query performance and lead to more accurate composite size estimation.

Based at least in part on the filter factor estimated in step 204, an access path for the database query may be determined. For example, as the foundation of a cost-based optimizer, the filter factor estimated with the compressed statistical data may be used for cost estimation of every candidate access path. Consequently, the optimizer can determine the optimal access path with the estimated filter factor. The proposed solution according to the exemplary embodiments can make more accurate filter factor estimation, which can facilitate efficient database query operations and improve performances related to join sequence, join method, predicate evaluate sequence, data access, sorting decision and so on.

Figure 6:
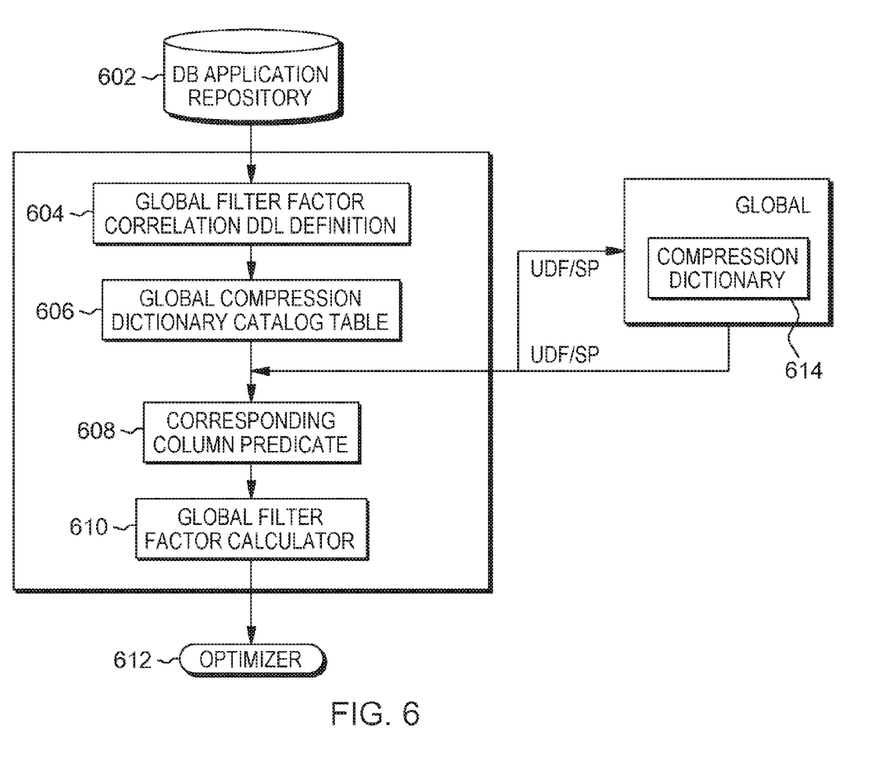
FIG. 6 is a diagram illustrating an exemplary architecture in accordance with an embodiment of the present disclosure.

FIG. 6 is a diagram illustrating an exemplary architecture in accordance with an embodiment of the present disclosure. The exemplary architecture may be implemented for a database system, a database application or any other apparatus suitable for conducting a database query by performing the process described in connection with FIG. 2. In the exemplary architecture, a global compression dictionary such as the global compression dictionary 614 shown in FIG. 4 is utilized to calculate a global filter factor for a query optimizer which may evaluate candidate access paths and create the best access plan for a database query.

In FIG. 6, filter factor estimation operations may be performed with respect to a Database (DB) application repository 602, for example, in accordance with the process described in combination with FIG. 2. In order for utilizing a global compression dictionary to estimate a global filter factor, a correlation between the global compression dictionary and a table column may be predefined by DDL definition 604, for example, according to a context associated with both of the global compression dictionary and the table column. In addition, some statistics with respect to elements in the global compression dictionary 614 may be summarized in a corresponding meta dictionary such as the meta dictionary shown in FIG. 5, and a global compression dictionary catalog table 606 may be added for the meta dictionary accordingly. As such, if a predicate 608 of the database query specifies a corresponding column correlated to this global compression dictionary 614, the global compression dictionary and the corresponding meta dictionary may be retrieved, for example by a User Defined Function (UDF) and/or a Stored Procedure (SP), for obtaining a digital representation and the compressed statistical data with respect to a literal in the predicate. The obtained compressed statistical data can be used to calculate a global filter factor, for example with expression (1) by a global filter factor calculator 610 shown in FIG. 6, which then provides the calculated global filter factor to the optimizer 612 for determining an optimal access path for the database query.

As described above, embodiments of this disclosure can be applied to estimate a more accurate filter factor in access path selection. The estimated filter factor may be regarded as a global filter factor which is derived from the globally collected statistics for a literal in a query predicate without assumption of even data distribution in a column addressed by the predicate, and thus can be used for evaluating a potential access path more efficiently and creating a best access plan with an optimal access path.

The proposed solution is particularly beneficial to the seldom occurred literals because it can offer statistical information about these literals for filter factor estimation, while the current statistical technology cannot make the filtering information accurate for these literals. Furthermore, employing a compression scheme in providing statistical information related to content of the target column can reduce the storage requirement and increase the I/O memory usage efficiency. For example, just 19 rows can contain statistical data about $2^{19}=524288$ literals if the statistical information is prepared on a scale of lengths of binary digital representations for these literals.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for estimation of a filter factor comprising:
    mapping a literal in a database query to a digital representation, wherein the database query comprises a predicate, the literal is a part of the predicate, and the digital representation is predetermined based at least in part on external statistical data; and
    estimating a filter factor for the predicate based at least in part on the digital representation and compressed statistical data, wherein the compressed statistical data are prepared at least in part from the external statistical data.

2. The method according to claim 1, wherein the predicate of the database query is related to a column of a table, and the external statistical data contain statistical information relevant to content of the column.

3. The method according to claim 2, wherein the statistical information relevant to the content of the column comprises information about occurrences of possible literals in a context relevant to the content of the column, and the possible literals comprise the literal in the database query.

4. The method according to claim 3, wherein the possible literals are assigned with respective digital representations having lengths which are related to the occurrences of the possible literals in the context.

5. The method according to claim 2, wherein the compressed statistical data comprise statistical information on a scale of lengths of digital representations determined according to content of the column.

6. The method according to claim 2, further comprising:
    updating the compressed statistic data based at least in part on change in at least one of: content of the column, and the external statistical data.

7. The method according to claim 1, further comprising:
    determining an access path for the database query based at least in part on the filter factor.

* * * * *